US008640789B2

(12) United States Patent
Harada et al.

(10) Patent No.: US 8,640,789 B2
(45) Date of Patent: Feb. 4, 2014

(54) OIL PULSE TOOL

(75) Inventors: Tetsuhiro Harada, Hitachinaka (JP); Tomomasa Nishikawa, Hitachinaka (JP); Kazutaka Iwata, Hitachinaka (JP); Shiniki Otsu, Naka (JP); Nobuhiro Takano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 331 days.

(21) Appl. No.: 12/991,415

(22) PCT Filed: May 8, 2009

(86) PCT No.: PCT/JP2009/059019
§ 371 (c)(1), (2), (4) Date: May 12, 2011

(87) PCT Pub. No.: WO2009/136664
PCT Pub. Date: Nov. 12, 2009

(65) Prior Publication Data

US 2011/0214894 A1 Sep. 8, 2011

(30) Foreign Application Priority Data

May 8, 2008 (JP) ................................ 2008-122398

(51) Int. Cl.
*B23Q 5/20* (2006.01)

(52) U.S. Cl.
USPC .......................................... 173/176; 176/181

(58) Field of Classification Search
USPC ............. 173/2, 93, 93.5, 104, 170, 176, 218; 310/47, 50, 58
See application file for complete search history.

(56) References Cited

U.S. PATENT DOCUMENTS

| | | | | |
|---|---|---|---|---|
| 5,154,242 | A * | 10/1992 | Soshin et al. | 173/178 |
| 5,366,026 | A * | 11/1994 | Maruyama et al. | 173/180 |
| 6,819,022 | B2 * | 11/2004 | Yamamoto et al. | 310/156.05 |
| 2002/0035876 | A1 * | 3/2002 | Donaldson, Jr. | 73/862.21 |
| 2002/0175656 | A1 * | 11/2002 | Matsunaga et al. | 320/128 |
| 2004/0217727 | A1 * | 11/2004 | Gilmore | 318/599 |

FOREIGN PATENT DOCUMENTS

| | | | |
|---|---|---|---|
| EP | 1 447 177 | A2 | 8/2004 |
| JP | 2006-88280 | A | 6/2006 |

* cited by examiner

*Primary Examiner* — Alexander Elve
*Assistant Examiner* — Nathaniel Chukwurah
(74) *Attorney, Agent, or Firm* — Kilpatrick Townsend & Stockton LLP

(57) ABSTRACT

According to an aspect of the invention, an oil pulse tool includes: a motor generating a driving force according to a driving voltage; an oil pulse unit driven by the driving force and generating a torque in a pulse-like shape when the motor passes a strike position on a shaft thereof; and an output shaft on which a front end tool is mounted, the output shaft being connected to the shaft, characterized in that the oil pulse tool further comprises driving adjusting means to control the driving voltage, the driving voltage is reduced during a given period including a timing when the torque is transmitted to the output shaft, and the reduced driving voltage is increased when the given period is finished.

7 Claims, 14 Drawing Sheets

OIL PULSE TOOL

This application is a U.S. National Stage of International Application No. PCT/JP2009/059019 filed May 8, 2009, and which claims the benefit of Japanese Patent Application No. 2008-122398, filed May 8, 2008 the entireties of which are incorporated by reference herein.

TECHNICAL FIELD

The present invention relates to an oil pulse tool driven to rotate by a motor for fastening a fastening member of a bolt or the like by utilizing an intermittent strike force generated by a hydraulic pressure.

BACKGROUND ART

As an impact tool for fastening a screw, a bolt or the like, an oil pulse tool of generating a strike force by utilizing a hydraulic pressure is known. The oil pulse tool is characterized in that an operating sound thereof is low since metals are not impacted to each other. As an example of disclosing the oil pulse tool, there is, for example, PTL 1, a motor is used as a power of driving an oil pulse unit, and an output shaft of the motor is directly connected to the oil pulse unit. When a trigger switch for operating the oil pulse tool is pulled, a driving power is supplied to the motor.

CITATION LIST

Patent Literature

PTL 1: JP-A-2006-88280

SUMMARY OF INVENTION

Technical Problem

Although according to the oil pulse tool of the background art, a rotational speed of an electric motor is controlled by changing a power supplied to the motor in proportion to an amount of pulling the trigger switch, the oil pulse tool does not carry out a control of changing to increase or reduce the power supplied to the electric motor in accordance with presence or absence of generating a torque (strike) in a pulse-like shape at the oil pulse unit. The inventors have found out that the background art is provided with the following problem to be resolved.

When a torque in a pulse-like shape is generated by the oil pulse unit, whereas a strong rotational torque is transmitted to a front end tool, the driving electric motor stops rotating temporarily, or is rotated in a reverse direction by an angle to some degree by a reaction of the strike. In the background art continuing supply of the power to the electric motor without change when the rotation is stopped or the electric motor is rotated in the reverse direction, a large current flows at that occasion, a large portion thereof becomes heat, and therefore, an efficiency of consuming the power is poor. Further, when the reverse rotation of the motor is stopped, the regular rotation is constituted and the strike position is passed again, the strike (pulse) is carried out although the strike is weak, the weak strike force does not contribute to fastening a fastening member at all, and therefore, an unnecessary operation of disturbing rotation of the motor is constituted.

The invention has been carried out in view of the above-described background and it is an object thereof to provide an oil pulse tool of controlling to restrain a weak strike force generated when a motor reversely rotated immediately after strike is rotated regularly.

Other object of the invention is to provide an oil pulse tool capable of reducing a consumption power of a motor by controlling a drive force of the motor immediately after strike in the oil pulse tool.

Solution to Problem

According to a characteristic of the invention, in an oil pulse tool having a motor, an oil pulse unit driven by the motor, and an output shaft connected to a shaft of the oil pulse unit and mounted with a front end tool, driving adjusting means for adjusting a driving force of the motor is provided, when a strike force is transmitted to the output shaft by a torque in a pulse-like shape generated at the oil pulse unit, a control is carried out such that the driving force of the motor is reduced, and the motor a rotation of which is disturbed by the torque in the pulse-like shape increases the driving force when a strike position of the shaft is passed. Particularly, when the motor is rotated in a reverse direction by a reaction of the strike to the output shaft generated by the torque in the pulse-like shape, the driving force of the motor is controlled to reduce when the motor is rotated reversely, and until the reverse rotation is stopped, the regular rotation is constituted and the impact position is passed. The driving adjusting means is, for example, an operating portion having a microcomputer of controlling a circuit of setting a voltage applied to the motor, the driving force can be increased or reduced by adjusting a power supplied to the motor.

According to other characteristic of the invention, the driving adjusting means drives the motor by a first reduced driving force when the motor is rotated reversely, and drives the motor by a second reduced driving force smaller than the first reduced driving force until the reverse rotation is stopped, the regular rotation is constituted and the impact position is passed. Further, the driving adjusting means may control to reduce the driving force of the motor immediately before a position of a pulse generated at the oil pulse unit, reduce further the driving force of the motor after the strike force is transmitted to the output shaft by the torque in the pulse-like shape generated at the oil pulse unit.

According to still other characteristic of the invention, the oil pulse tool is provided with a torque detecting sensor of a strain gage or the like of detecting that a strike force is generated at the output shaft, and the driving adjusting means adjusts the driving force of the motor based on an output of the torque detecting sensor. Further, rotational position detecting means of a Hall IC or the like for detecting a rotational position of the motor is provided and the driving adjusting means adjusts the driving force of the motor based on an output of the rotational position detecting means.

According to still other characteristic of the invention, the motor is a brushless direct current motor, and the driving adjusting means adjusts a power supplied to the brushless direct current motor by changing a duty ratio of a power supplied by a PWM control.

Advantageous Effects of Invention

According to an aspect of the present invention, immediately before the strike force is transmitted to the output shaft or when the strike force is transmitted to the output shaft, the driving force of the motor is reduced, and since the motor the rotation of which is disturbed by the torque in the pulse-like shape is recovered to the normal driving force when the strike position of the shaft is passed, the driving force (power) consumed when the rotation of the motor is disturbed in generating the oil pulse can be reduced, and therefore heat caused thereby is prevented from being generated.

According to another aspect of the present invention, the driving adjusting means reduces the driving force of the motor when the motor is rotated reversely and until the reverse rotation is stopped, the regular rotation is constituted and the impact position is passed, and therefore, the driving force (power) consumed when rotation of the motor is disturbed is reduced, and heat caused thereby is prevented from being generated.

According to another aspect of the present invention, when the motor is rotated reversely, the motor is driven by a first reduced driving force, and the motor is driven by a second reduced driving force lower than the first reduced driving force until the reverse rotation is stopped, the regular rotation is constituted and the impact position is passed, and therefore, a fine adjustment of the driving force in accordance with the rotational position of the motor is carried out, and therefore, the output (power) consumed by the motor is further reduced.

According to another aspect of the present invention, the driving force of the motor is reduced immediately before the position of the pulse generated at the oil pulse unit, and therefore, an adverse influence by the driving force (power) of the motor for the impact is reduced.

According to another aspect of the present invention, a torque detecting sensor is provided to detect the generation of the strike force, the driving adjusting means adjusts the driving force of the motor based on an output of the torque detecting sensor, and therefore, a timing of reducing the driving force of the motor is detected by a simple method.

According to another aspect of the present invention, rotational position detecting means is provided to detect a rotational position of the motor, the driving adjusting means adjusts the driving force of the motor based on an output of the rotational position detecting means, and therefore, the driving force can be controlled beforehand in accordance with the rotational position of the motor.

According another aspect of to the present invention, the driving adjusting means adjusts the power supplied to the brushless direct current motor by changing the duty ratio of the supplied power by the PWM control, and therefore, an efficient power adjustment is carried out.

DESCRIPTION OF EMBODIMENTS

Figure 1:
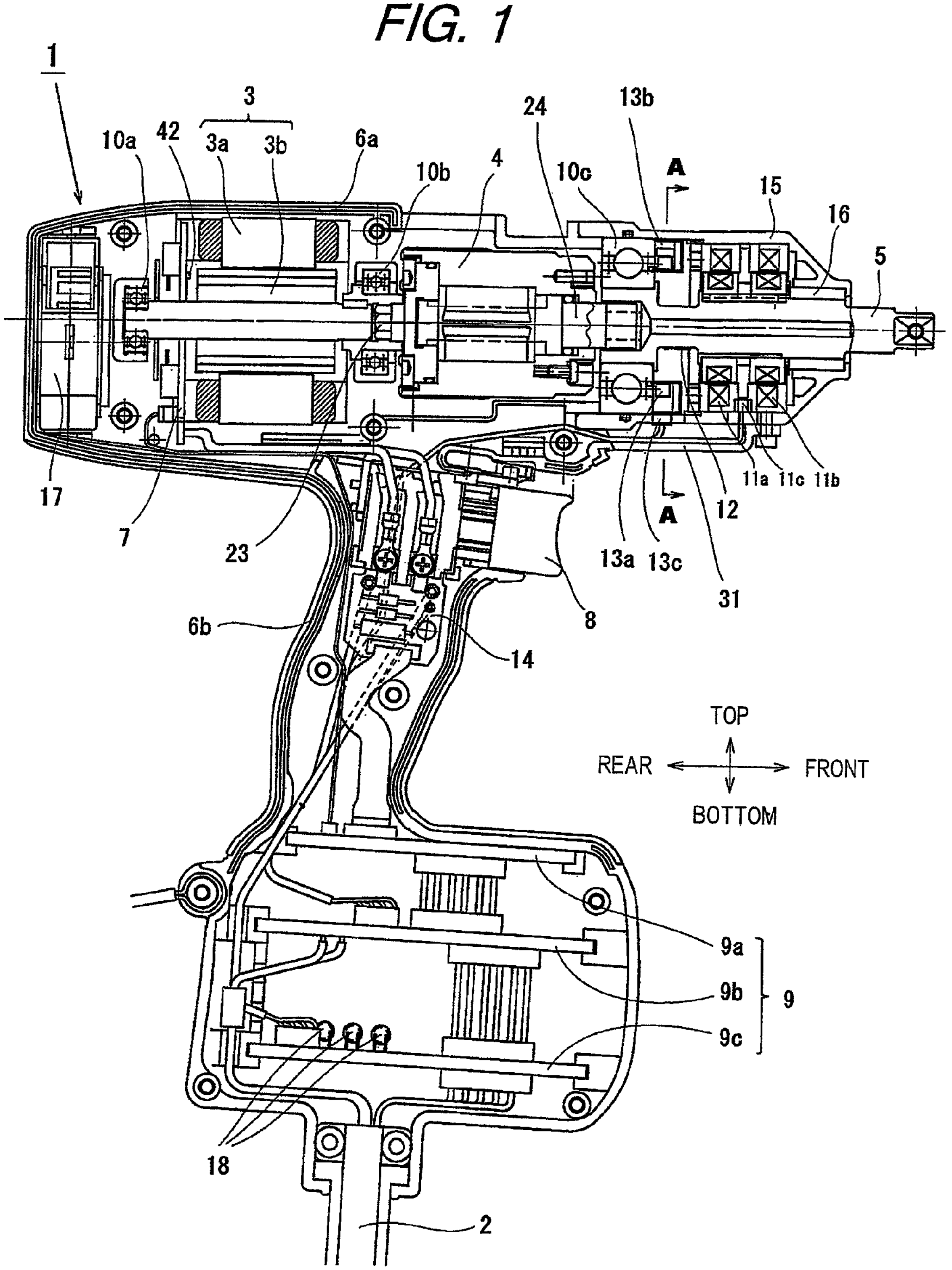
FIG. 1 is a sectional view showing a total of an impact driver according to the embodiment of the invention.

An embodiment of the invention will be explained in reference to the drawings as follows. Further, in explaining the specification, an explanation will be given by constituting an up and down direction and a front and rear direction as directions shown in FIG. 1. FIG. 1 is a sectional view showing a total of an oil pulse tool according to the embodiment of the invention.

An oil pulse tool 1 carries out an operation of nut fastening, bolt fastening or the like by continuously or intermittently transmitting a rotational strike force to a front end tool, not illustrated, of a hexagonal socket or the like by exerting a rotational force and a strike force to an output shaft 5 connected to an oil pulse unit 4 by driving a motor 3 by utilizing a power supplied from outside by a power source cord 2 and driving the oil pulse unit 4 by the motor 3.

A power source supplied by the power source cord 2 is a direct current or an alternating current of AC100V or the like, in the case of the alternating current, the alternating current is converted into a direct current by providing a rectifier, not illustrated, at inside of the oil pulse tool 1, thereafter, transmitted to a driving circuit of the motor. The motor 3 is a brushless direct current motor having a rotor **3*b* having a permanent magnet on an inner peripheral side, and having a stator 3*a* having a winding wound around a core on an outer peripheral side, a rotating shaft thereof is fixed by two of bearings 10*a*, 10*b* and is contained at inside of a barrel portion 6*a* in a cylindrical shape of a housing. The housing is fabricated with the barrel portion 6*a* and a handle portion 6*b* integrally by a plastic or the like. Rearward from the motor 3, a driving circuit board 7 for driving the motor 3 is arranged, and an inverter circuit constituted by a semiconductor element of FET or the like and a Hall element of detecting a rotational position of the rotor 3*b*, and a rotational position detecting element 42 of a Hall IC or the like are mounted above the circuit board. A cooling fan unit 17 for cooling is provided at a rearmost end at inside of the barrel portion 6*a*** of the housing.

A trigger switch 8 is arranged at a vicinity of a portion of the housing for attaching the handle portion **6*b* extended from the barrel portion 6*a* in a lower direction substantially orthogonally thereto, and a signal in proportion to an amount of pulling the trigger switch 8 is transmitted to a motor controlling board 9***a* by a switch circuit board 14 provided right therebelow. A lower side of the handle portion 6*b* is provided with three of control boards 9 of the motor controlling board 9*a*, a torque detecting board 9*b*, and a rotational position detecting board 9*c*. The rotational position detecting board 9*c* is provided with a plurality of light emitting diodes (LED) 18, and light of the light emitting diode 18 is arranged to be able to be identified from outside by transmitting a transmitting widow or passing a through hole, not illustrated, of the housing.

According to the oil pulse unit 4 incorporated at inside of the barrel portion 6*a* of the housing, a liner plate 23 on a rear side is directly connected to a rotating shaft of the motor 3, and a main shaft 24 on a front side is directly connected to the output shaft 5. When the motor 3 is started by pulling the trigger switch 8, a rotational force of the motor 3 is transmitted to the oil pulse unit 4. An oil is filled at inside of the oil pulse unit 4, when a load is not applied to the output shaft 5, or when the load is small, the output shaft 5 is rotated substantially in synchronism with rotation of the motor 3 only by a resistance of the oil. When a strong load is applied to the output shaft 5, rotation of the output shaft 5 and the main shaft 24 is stopped, only a liner on an outer peripheral side of the oil pulse unit 4 continues rotating, a pressure of the oil is rapidly elevated to generate an impact pulse at a position of hermetically closing the oil present at one portion in one rotation, the main shaft 24 is rotated by a strong torque in a steeple-like shape, and a large fastening torque is transmitted to the output shaft 5. Thereafter, a similar striking operation is repeated at several times and an object of fastening is fastened by a set torque.

The output shaft 5 is held by a bearing 10*c* at an end portion on a rear side and a front side thereof is held by a case 15 by a metal bearing 16. Although the bearing 10*c* of the embodiment is a ball bearing, other bearing of a needle bearing or the like can be used. The bearing 10*c* is attached with a rotational position detecting sensor 13. The rotational position detecting sensor 13 is constituted by including a permanent magnet 13*a* fixed to an inner ring of the ball bearing 10*c* and rotated in synchronism with the output shaft 5, a sensor housing fixed to an outer bearing thereof for covering the ball bearing, and a position detecting element 13*b* of a Hall IC or the like. The permanent magnet 13*a* includes a plurality of sets of magnetic poles, and a connector 13*c* for transmitting a signal of the position detecting element 13*b* to outside is provided at a portion on an outer peripheral side of a cover opposed to the permanent magnet 13*a*.

On an inner peripheral side of the permanent magnet 13*a*, a diameter of the output shaft 5 becomes slender, and the slender portion is attached with a strain gage 12 constituting a torque detecting sensor. The diameter of the output shaft 15 becomes bold on a front side of a portion thereof attached with the strain gage 12, and the portion is provided with a transformer set 11*a* for inputting for supplying a voltage to the strain gage 12, and a transformer set 11*b* for outputting for transmitting an output from the strain gage 12. The transformer set 11*a* for inputting and the transformer set 11*b* for outputting are constituted by including coils respectively arranged on inner peripheral sides and outer peripheral sides thereof. The coils on the inner peripheral sides are fixed to the output shaft 5, and the coils on the outer peripheral sides are fixed to the case 15. Input and output voltages to and from the transformer set 11*a* on the inner peripheral side and the transformer set 11*b* for outputting are transmitted to the torque detecting board 9*b* by way of a connector 11*c*. The respective portions described above attached to the output shaft 5 are integrated to the case 15 in a shape of a circular cylinder, and the case 15 is attached to the barrel portion 6*a* of the housing. Further, a lower portion of the case 15 is provided with a wiring cover 31 for covering a wiring or the like for connection.

Figure 2:
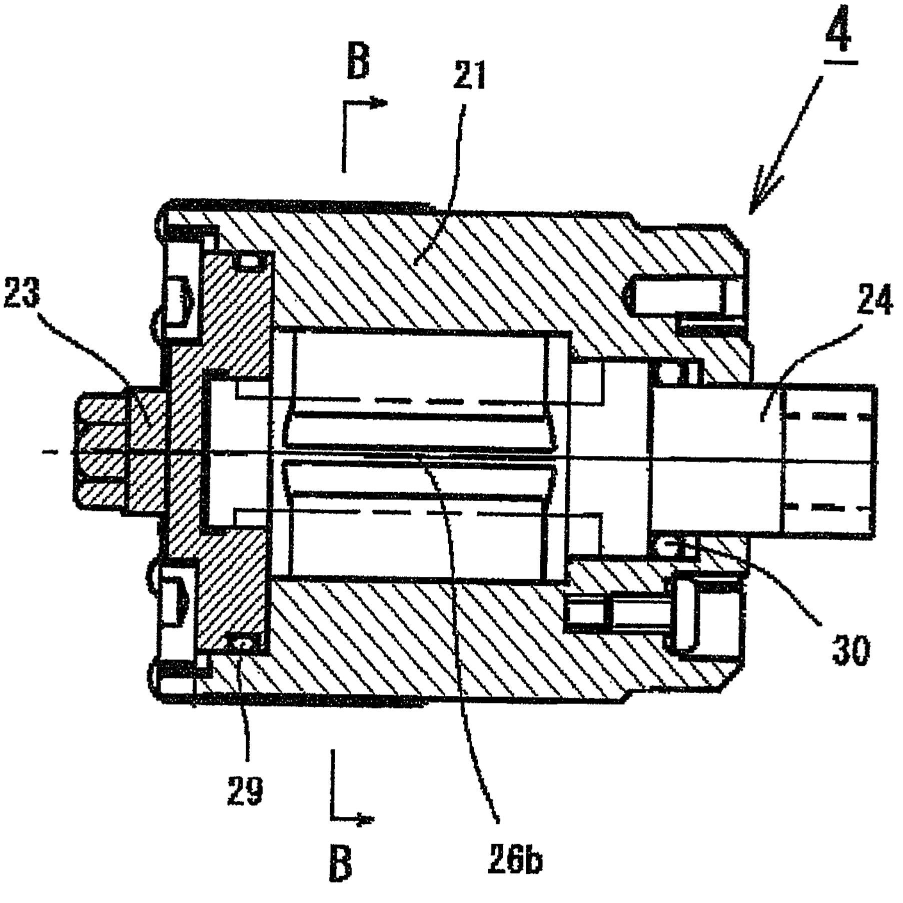
FIG. 2 is an enlarged sectional view of an oil pulse unit 4 of FIG. 1.

FIG. 2 is an enlarged sectional view of the oil pulse unit 4 of FIG. 1. The oil pulse unit 4 is mainly constituted by two portions of a driving portion rotated in synchronism with the motor 3 and an output portion rotated in synchronism with the output shaft 5 attached with a front end tool. The driving portion rotated in synchronism with the motor 3 includes the liner plate 23 directly connected to the rotating shaft of the motor 3, and an integrally molded liner 21 which is fixed to extend to a front side on an outer peripheral side thereof and an outer diameter of which constitutes substantially a shape of a circular pillar. The output portion rotated in synchronism with the output shaft 5 is constituted by including the main shaft 24, and blades 25*a*, 25*b* attached to grooves formed on an outer peripheral side of the main shaft 24 to be spaced apart from each other by 180 degrees.

The main shaft 24 is penetrated to the integrally molded liner 21, and is held to be able to rotate at inside of a closed space formed by the liner 21 and the liner plate 23, and an oil (working fluid) for generating a torque is filled at inside of the closed space. An O ring 30 is provided between the liner 21 and the main shaft 24, an O ring 29 is provided between the liner 21 and the liner plate 23, and an airtightness therebetween is ensured. Further, although not illustrated, the liner 21 is provided with a relief valve for escaping a pressure of the oil from a high pressure chamber to a low pressure chamber, and a fastening torque can be adjusted by controlling a maximum pressure of the oil generated.

Figure 3:
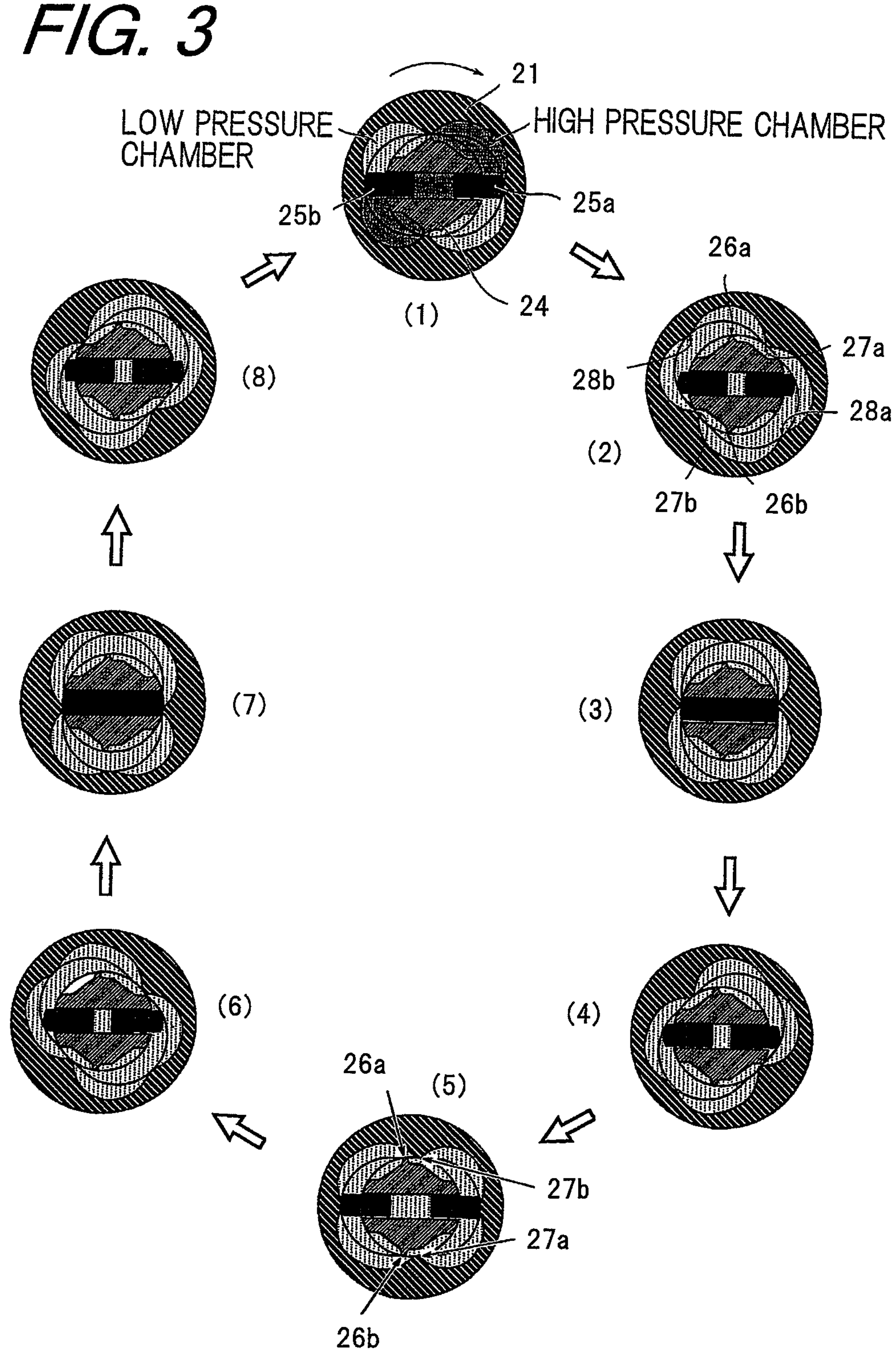
FIG. 3 illustrates B-B sections of FIG. 2 and sectional views showing a movement of one rotation in a state of using the oil pulse unit 4 by 8 stages.

FIG. 3 illustrates B-B sections of FIG. 2, and sectional views showing a movement in one rotation in a state of using the oil pulse unit 4 by 8 stages. Inside of the liner 21 is formed with a liner chamber having a section of forming 4 regions as shown by FIG. 3 (1). At the outer peripheral portion of the main shaft 24, the blades 25*a*, 25*b* are fittingly inserted to two pieces of the groove portions opposed to each other, and the blades 25*a*, 25*b* are urged in a circumferential direction by the springs to be brought into contact with the inner face of the liner 21. The outer peripheral face of the main shaft 24 between the blades 25*a*, 25*b* is provided with projected shape seal faces 26*a*, 26*b* constituting projected streaks extended in an axial direction. The inner peripheral face of the liner 21 is formed with projected shape seal faces 27*a*, 27*b* and projected shape portions 28*a*, 28*b* constituted by being built up in a hut-like shape.

According to the oil pulse tool 1, in fastening a bolt, when a seat face of the fastening bolt is seated, a load is applied to the main shaft 24, the main shaft 24, the blades 25*a*, 25*b* are brought into a state of being substantially stopped, and only the liner 21 continues rotating. In accordance with rotation of the liner 21 relative to the main shaft 24, an impact pulse once per one rotation is generated, in generating the impact pulse, at inside of the oil pulse tool 1, the projected shape seal face 27*a* formed at the inner peripheral face of the liner 21 and the projected shape seal face 26*a* formed at the outer peripheral face of the main shaft 24 are brought into contact with each other. At the same time, the projected shape seal face 27*b* and the projected shape seal face 26*b* are brought into contact with each other. By respectively bringing the pair of projected shape seal faces formed at the inner peripheral face of the liner 21 and the pair of projected shape seal faces formed at the outer peripheral face of the main shaft 24 into contact with each other in this way, inside of the liner 21 is partitioned to two of high pressure chambers and two of low pressure chambers. Further, an instantaneous strong rotational force is generated at the main shaft 24 by a pressure difference between the high pressure chamber and the lower pressure chamber.

Next, an operational procedure of the oil pulse unit 4 will be explained. First, the motor 3 is rotated by pulling the trigger 8, and in accordance therewith, also the liner 21 is rotated in synchronism therewith. Although according to the embodiment, the liner plate 23 is directly connected to the rotating shaft of the motor 3, and is rotated by the same revolution number, the invention is not limited thereto but the liner plate 23 may be connected to the rotating shaft by way of a speed reducing mechanism.

(1) through (8) of FIG. 3 are views showing states of rotating the liner 21 by one rotation in an relative angle relative to the main shaft 24. As described above, when a load is not applied to the output shaft 5, or the load is small, the main shaft 24 is rotated substantially in synchronism with rotation of the motor 3 only by the resistance of the oil. When a strong load is applied to the output shaft 5, rotation of the main shaft 24 directly connected thereto is stopped, and only the liner 21 on the outer side continues rotating.

(1) of FIG. 3 is a view showing a positional relationship when a strike force by an impact pulse is generated at the main shaft 24. The position shown in (1) is 'a position of hermetically closing the oil' which is present at one portion in one rotation. Here, the projected shape seal faces 27*a* and 26*a*, the seal face 27*b* and the seal face 26*b*, the blade 25*a* and the projected shape portion 28*a*, and the blade 25*b* and the projected shape portion 28*b* are brought into contact with each other respectively in an entire region in the axial direction of the main shaft 24, thereby, an inner space of the liner 21 is partitioned to 4 chambers of two high pressure chambers and two low pressure chambers.

Here, a high pressure and a low pressure are pressures of the oil present at inner portion. Further, when the liner 21 is rotated by rotation of the motor 3, a volume of the high pressure chamber is reduced, and therefore, the oil is compressed and the high pressure is generated instantaneously, and the high pressure pushes out the blade 25 to a side of the low pressure chamber. As a result thereof, the main shaft 24 is instantaneously operated with a rotational force by way of the upper and lower blades 25*a*, 25*b* and a strong rotational torque is generated. By forming the high pressure chambers, a strong strike force of rotating the blades 25*a*, 25*b* in the clockwise direction of the drawing is operated. The position shown in FIG. 3 (1) is referred to as 'a strike position' I the specification.

(2) of FIG. 3 shows a state of rotating the liner 21 from the strike position by 45 degrees. When the strike position shown in (1) is passed, the state of bringing the projected shape seal faces 27*a* and 26*a*, the projected shape seal face 27*b* and seal face 26*b*, the blades 25*a* and the projected shape portion 28*a*, and the blade 25*b* and the projected shape portion 28*b* into contact with each other is released, and therefore, the spaces partitioned into 4 chambers of inside of the liner 21 are released, the oil flows to the respective spaces, and therefore, the rotational torque is not generated, and the liner 21 is rotated further by rotation of the motor 3.

(3) of FIG. 3 shows a state of rotating the liner 21 from the strike position by 90 degrees. Under the state, the blades 25*a*, 25*b* are brought into contact with the projected shape seal faces 27*a*, 27*b* and moved back to the inner side in a radius direction up to positions of not being projected from the main shaft 24, and therefore, an influence of the pressure of the oil is not effected and the rotational torque is not generated, and therefore, the liner 21 is rotated as it is.

(4) of FIG. 3 shows a state of rotating the liner 21 from the strike position by 135 degrees. Under the state, the inner spaces of the liner 21 are communicated with each other and a change in the pressure of the oil is not brought about, and therefore, the rotational torque is not generated in the main shaft.

(5) of FIG. 3 shows a state of rotating the liner 21 from the strike position by 180 degrees. At the position, although the projected shape seal faces 27*b* and 26*a*, the projected shape seal faces 27*b* and the seal face 26*b* are proximate to each other, the projected shape seal faces 27*b* and 26*a* and the projected shape seal face 27*b* and the seal face 26*b* are not brought into contact with each other. This is because the projected shape seal faces 26*a* and 26*b* formed at the main shaft 24 are not disposed at positions of being symmetric with each other relative to an axis of the main shaft. Similarly, also the projected shape seal faces 27*a* and 27*b* formed at the inner periphery of the liner 21 are not disposed at positions of being symmetric with each other relative to the axis of the main shaft. Therefore, at the position, the influence of the oil is hardly effected, and therefore, the rotational torque is hardly generated. Further, although the oil filled at the inner portion is provided with a viscosity, when the projected shape seal faces 27*b* and 26*a*, or the projected shape seal faces 27*a* and 26*b* are opposed to each other, the high pressure chambers are formed only slightly, and therefore, more or less rotational torque is generated, and therefore, different from (2) through (4), (6) through (8), the rotational torque is not effective in fastening.

The states of (6) through (8) of FIG. 3 are substantially similar to those of (2) through (4), and in the states, the rotational torque is not generated. When rotated further from the state of (8), the state of (1) of FIG. 3 is brought about, the projected shape seal faces 27*a* and 26*a*, the seal face 27*b* and the seal face 26*b*, the blade 25*a* and the projected shape portion 28*a*, and the blade 25*b* and the projected shape portion 28*b* are brought intro contact with each other respectively in the entire region in the axial direction of the main shaft 24, thereby, the inner space of the liner 21 is partitioned to 4 chambers of the two high pressure chambers and the two low pressure chambers, and therefore, the strong rotational torque is generated at the main shaft 24.

Figure 4:
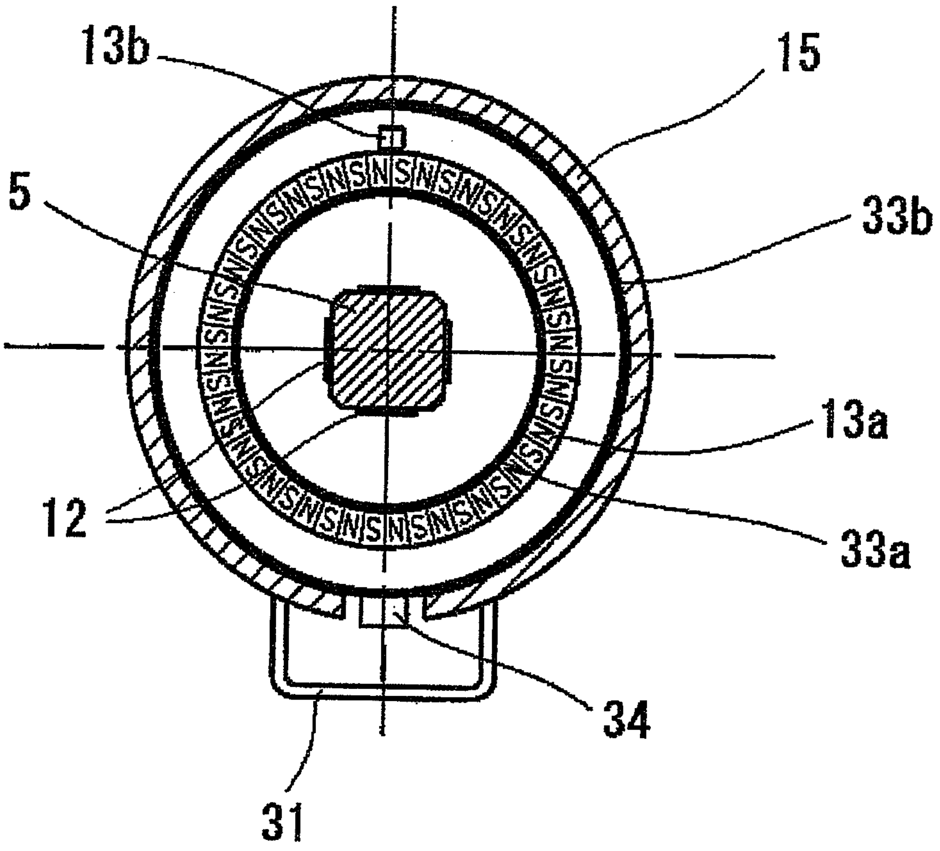
FIG. 4 is a sectional view of an A-A portion of FIG. 1.

Next, structures of attaching the rotational position detecting sensor and the torque detecting sensor will be explained in reference to FIG. 4. FIG. 4 is a sectional view of A-A portion of FIG. 1. A rotational position detecting sensor cover 33*b* made of a metal which is not rotated is disposed on an inner side of the case 15. An inner peripheral side thereof is provided with a rotor 33*a* in a shape of a circular cylinder, and an outer periphery of the rotor 33*a* is fixed with the permanent magnet 13*a* arranged with magnetic poles in a circumferential direction. The rotor 33*a* is fixed to the inner ring of the bearing 10*c* and is rotated along with the inner ring. The position detecting element (s) 13*b* of a Hall element or the like is (are) provided at one portion or a plurality of portions on an outer peripheral side of the permanent magnet 13*a*, thereby, the rotational position of the output shaft 5 can accurately be detected. A connector 34 is a connector for connecting an output of the position detecting element 13*b* to outside, and there is provided a connecting line for connecting from the position detecting element 13*b* to the connector 34 by passing a path not illustrated in the sectional view. The wiring cover 31 is a cover for forming a space of passing a wiring for detecting the rotational position and a wiring for the torque detecting sensor.

The output shaft 5 is disposed at a space on an inner peripheral side of the rotor 33*a*. Here, as can be understood in reference to FIG. 4, in the output shaft 5 in the shape of circular pillar, only at a position of attaching the strain gage 12, a diameter thereof becomes slender, and a section thereof is substantially constituted by a quadrangular shape. Further, the strain gages 12 are provided respectively at four of flat faces disposed on an outer periphery of the section. Thereby, an accuracy of detecting the torque can be promoted.

As has been explained above, according to the embodiment, the rotational position detecting sensor and the torque detecting sensor are arranged at the same position in the axial direction of the output shaft, or overlappingly, and therefore, an entire length of the output shaft can be shortened and an oil pulse tool having a short entire length (front and rear length) can be realized. Further, the rotational position detecting sensor is arranged on the outer peripheral side, and therefore, a diameter of a rotor of the rotational position detecting sensor is enlarged and a position detecting accuracy is promoted. Further, the output shaft is rotatably fixed by the bearing, the rotational position detecting sensor is fixed to the bearing, and therefore, the rotational position detecting sensor can be fabricated integrally with the bearing, and the oil pulse tool easy to be integrated can be realized. Further, the rotational position detecting sensor is constituted by the rotor and the Hall element, the rotor is fixed to a rotational portion of the bearing, and therefore, the rotating portion of the bearing is made to be able to serve to hold the rotor, and a reduction in a number of parts can be realized.

Figure 5:
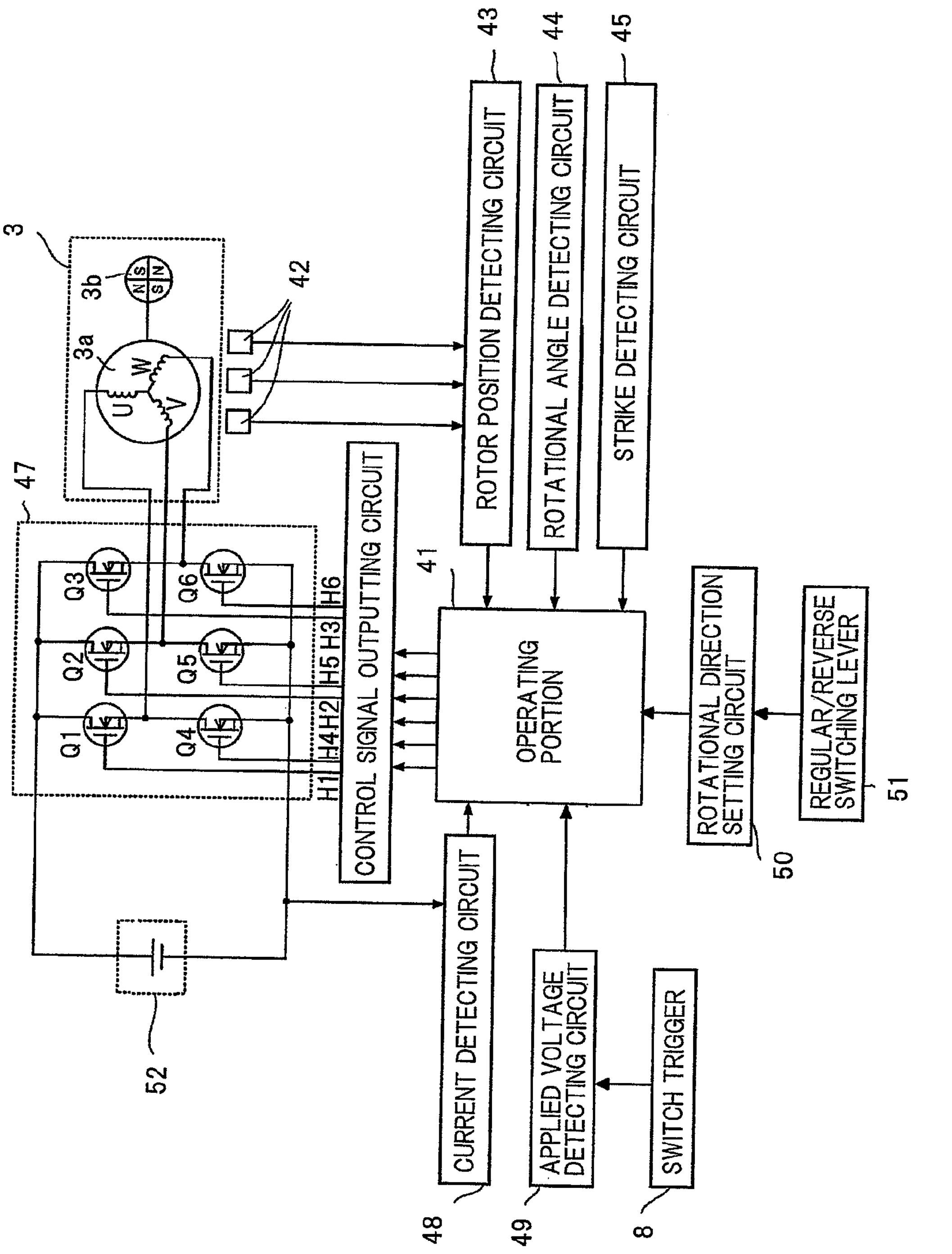
FIG. 5 is a block diagram showing a constitution of a drive control system of a motor 3 according to the embodiment of the invention.

Next, constitution and operation of a drive control system of the motor 3 will be explained in reference to FIG. 5. FIG. 5 is a block diagram showing the constitution of the drive control system of the motor 3. According to the embodiment, the motor 3 is constituted by a 3 phase brushless direct current motor. The brushless direct current motor is of an inner rotor type, and includes the rotor (rotor) 3*b* constituted by including a permanent magnet (magnet) including pluralities of sets of N poles and S poles, the stator 3*a* (stator) constituted by 3 phases of stator windings U, V, W connected by star connection, and three rotational position detecting elements 42 arranged at respective predetermined intervals, for example, respective angles of 30° in a peripheral direction for detecting the rotational position of the rotor 3*b*. Directions and time of conducting electricity to the stator windings U, V, Ware controlled based on position detecting signals from the rotational position detecting elements 42, and the motor 3 is rotated.

A driving circuit 47 is constituted by including 6 pieces of switching elements Q1 through Q6 of FET or the like connected in a 3 phase bridge style. Respective gates of 6 pieces of the switching elements Q1 through Q6 connected by bridge connection are connected to a control signal output circuit 46, and respective drains or respective sources of 6 pieces of the switching elements Q1 through Q6 are connected to the stator windings U, V, W connected by star connection. Thereby, 6 pieces of the switching elements Q1 through Q6 carry out a switching operation by switching element driving signals (driving signals of H1 through H6) inputted from the control signal output circuit 46, and supply a power to the stator windings U, V, W by constituting a direct current power source 52 applied to the driving circuit 47 as 3 phases (U phase, V phase and W phase) as voltages Vu, Vv, Vw. Further, the direct current power source 52 may be constituted by a secondary battery provided attachably and detachably.

In the switching element driving signal (3 phase signals) of driving the respective gates of 6 pieces of the switching elements Q1 through Q6, 3 pieces of the negative power source side switching elements Q4, Q5, Q6 are supplied as pulse width modulating signals (PWM signals) H4, H5, H6, an amount of supplying a power to the motor 3 is adjusted by changing pulse widths (duty ratios) of the PWM signals based on a detecting signal of an applied voltage setting circuit 49 from an amount of operating (stroke) of the trigger switch 8 by an operating portion 41, and start/stop and a rotational speed of the motor 3 are controlled.

Here, the PWM signals are supplied to either one of positive power source side switching elements Q1 through Q3 or the negative power source side switching elements Q4 through Q6 of the driving circuit 47, and by switching the switching elements Q1 through Q3 or the switching elements Q4 through Q6 at a high speed, as a result, powers supplied from the direct current power source to the respective stator windings U, V, W are controlled. Further, according to the embodiment, the PWM signals are supplied from the negative power source side switching elements Q4 through Q6, and therefore, the rotational speed of the motor 3 can be controlled by adjusting the powers supplied to the respective stator windings U, V, W by controlling the pulse widths of the PWM signals.

The oil pulse tool 1 is provided with a regular/reverse switching lever 51 for switching a rotational direction of the motor 3, and a rotational direction setting circuit 50 switches the rotational direction of the motor at each time of detecting a change in the regular/reverse switching lever 51 and transmits a control signal thereof to the operating portion 41.

The operating portion 41 is constituted by including a center processing unit (CPU) for outputting a driving signal based on a processing program and data, ROM for storing the processing program and control data, RAM for temporarily storing the data, a timer and the like, although not illustrated.

A rotational angle detecting circuit 44 is a circuit of inputting a signal from the position detecting element 13*b* of the rotational position detecting sensor 13, and detecting a rotational position (rotational angle) of the output shaft 5, and outputting a detecting value thereof to the operating portion 41. A strike detecting circuit 45 is a circuit of inputting a signal from the strain gage 12 and detecting a timing of striking by detecting generation of the torque.

The control signal output circuit 46 forms a driving signal for alternately switching the predetermined switching elements Q1 through Q6 based on output signals of the rotational direction setting circuit 50 and a rotor position detecting circuit 43 and the driving signal is outputted from the control signal output circuit 46. Thereby, electricity is conducted alternately to the predetermined wirings of the stator windings U, V, W, and the rotor 3*b* is rotated in the set rotational direction. In this case, the driving signal applied to the negative power source side switching elements Q4 through Q6 of the driving circuit 47 is outputted as the PWM modulating signal based on an output control signal of the applied voltage setting circuit 49. A value of a current supplied to the motor 3 is measured by a current detecting circuit 48 and the value is adjusted to set driving power by feeding back the value to the operating portion 41. Further, the PWM signals may be applied to the positive power source side switching elements Q1 through Q3.

Next, a control of changing the power supplied to the motor 3 in cooperation with striking of the oil pulse unit 4 will be explained in reference to FIGS. 6A, 6B and 7.

Figure 6A:
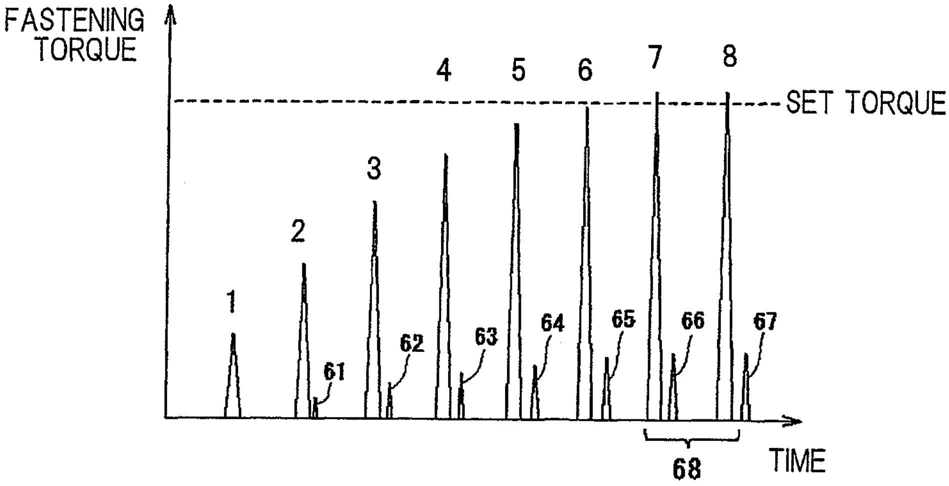
FIG. 6A is a drawing showing a relationship between a fastening torque and time until striking is carried out at the oil pulse unit 4 and fastening is carried out up to a set torque in a background art.

FIG. 6A is a drawing showing a relationship between a fastening torque and time until fastening to a set torque by carrying out striking by the oil pulse unit 4 in a background art. In fastening a bolt, according to the oil pulse tool 1, although the liner 21 and the main shaft 24 are rotated in synchronism with each other, when the load is applied to the main shaft 24, the main shaft 24 is brought into a state of being substantially stopped and only the liner 21 continues rotating. Further, by an operation of the oil pulse unit, an intermittent fastening torque is transmitted to the output shaft 5. A drawing showing the state is FIG. 6A. The ordinate designates a magnitude of the fastening torque and the abscissa designates time. Numerals above torque curves in a shape of a steeple generated intermittently designate numbers of (strike) times of pulses. Here, small pulses 61 through 67 are generated on right sides of the pulses in shapes of large steeples. A principle of generating the pulses 61 through 67 will further be explained in reference to FIG. 6B.

Figure 6B:
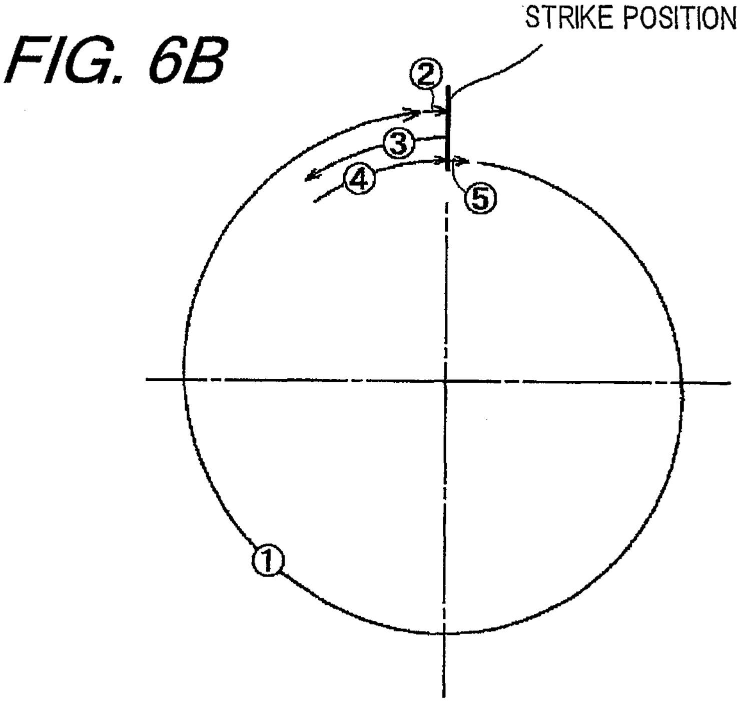
FIG. 6B is a view showing a situation of rotating a liner 21 relative to an output shaft 5 when striking by the oil pulse unit 4 is carried out.

FIG. 6B is a drawing showing a situation of rotating the liner 21 relative to the output shaft 5 when striking is carried out, showing, for example, a situation of striking 68 of seventh through eighth time of FIG. 6A. In FIG. 6B, when the motor 3 is rotated substantially by one rotation by a normal rotation control (path indicated by circle 1 in the drawing), and reaches a strike position of fifth time, the liner 21 and the motor 3 are reversely rotated by a distance to some degree by a reaction force received from the output shaft 5 (path indicated by circle 3 in the drawing). Although the distance is not constant by a magnitude of the reaction force, a viscosity of the oil filled at inside of the oil pulse unit 4 or the like, when the distance is large, there is also a case of returning by about 60 degrees in the rotational angle. Normally, it is insufficient for fastening a fastening member normally by one time striking, and therefore, the motor 3 needs to be rotated regularly again. Therefore, although a predetermined driving power is supplied to the motor 3, when a driving power for regular rotation is supplied in reversely rotating the motor 3 (path indicated by circle 3 in the drawing), a large amount of a current flows and heat is generated, and therefore, an efficiency is poor and electricity is wastefully used. Therefore, according to the embodiment, the driving power in the path of circle 3 is made to be reduced more than at normal time.

Further, when the motor 3 is powerfully accelerated in starting to rotate the motor 4 regularly (path indicated by circle 4 in the drawing), when coming to the strike position (position between circle 4 and circle 5 in the drawing), the pulse 64 is generated although the torque is small. However, as can be understood from FIG. 6A, the torque is considerably smaller than the torque strike force carried out by regular striking, and therefore, the torque is not effective in fastening the fastening member. Therefore, at the strike position between circle 4 and circle 5 in (2), it is preferable to rotate the motor 3 slowly so as not to generate the pulse. Generally, the torque generated in passing the strike position by the oil pulse unit 4 is provided with a property of being large at high speed and small at low speed by a property of the viscosity of the oil. Therefore, according to the invention, the pulse is controlled not to be generated at the oil pulse unit 4 by rotating the motor 3 at low speed by making the acceleration gradual until passing the strike position between circle 4 and circle 5 in the drawing. Therefore, in the acceleration of circle 4 in the drawing, the driving power supplied to the motor 3 is reduced. After passing the strike position, acceleration of the motor 3 is returned again to the normal control, and the control is repeated until fastening the fastening member by the predetermined torque.

Further, the influence on the motor 3 may be controlled to reduce at a moment of striking by reducing the supply power at a section of circle 2 immediately before the strike position by making the above-described power control finer. Further, at a section of circle 5 immediately after passing the strike position again, the motor 3 may not be abruptly accelerated but may be accelerated after eliminating the influence of the oil viscosity at a vicinity of the strike position.

Figure 7:
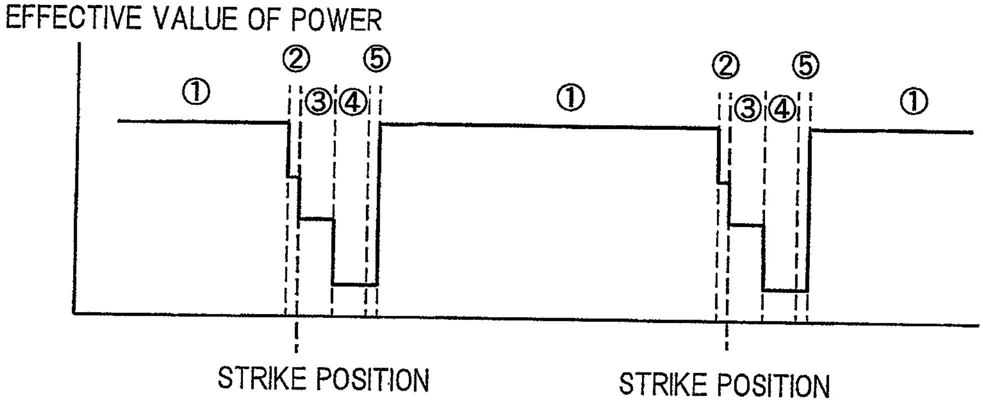
FIG. 7 is a diagram showing an example of an effective value of a power supplied to the motor 3 at a rotational position of the liner 21 shown in FIG. 6B.

FIG. 7 is a diagram showing an example of an effective value of a power supplied to the motor 3 at a rotational position shown in FIG. 6B. At a section of circle 1, there is provided a power supplied to the motor 3 in normal rotation, the power is dropped to about 75% immediately before a strike position of circle 2, when striking is carried out and the motor 3 is reversely rotated at a section of circle 3, the supplied power is dropped to about a half, and when rotation of the motor 3 is stopped, the supplied power is further dropped and the motor 3 is slowly accelerated (section of circle 4). When the strike position is passed, and section of circle 5 is passed, the power supplied in normal rotation is recovered (section of circle 1). Further, although the power is represented as effective value in the diagram, for example, a control by PWM (Pulse Width Modulation) system may be used, and a rate of a time period of making a switch of a direct current power source ON as compared with a time period of making the switch OFF (duty ratio) may be reduced at time of a position of circle 3 or circle 4 in comparison with that at position of circle 1. Further, also at a position of circle 2, or circle 5, the duty ratio may be controlled to reduce in comparison with that at position of circle 1. Further, as a method of controlling the power, by a PAM system (Pulse Amplitude Modulation) of changing a voltage per se, the supplied voltage may be controlled to reduce.

Figure 8:
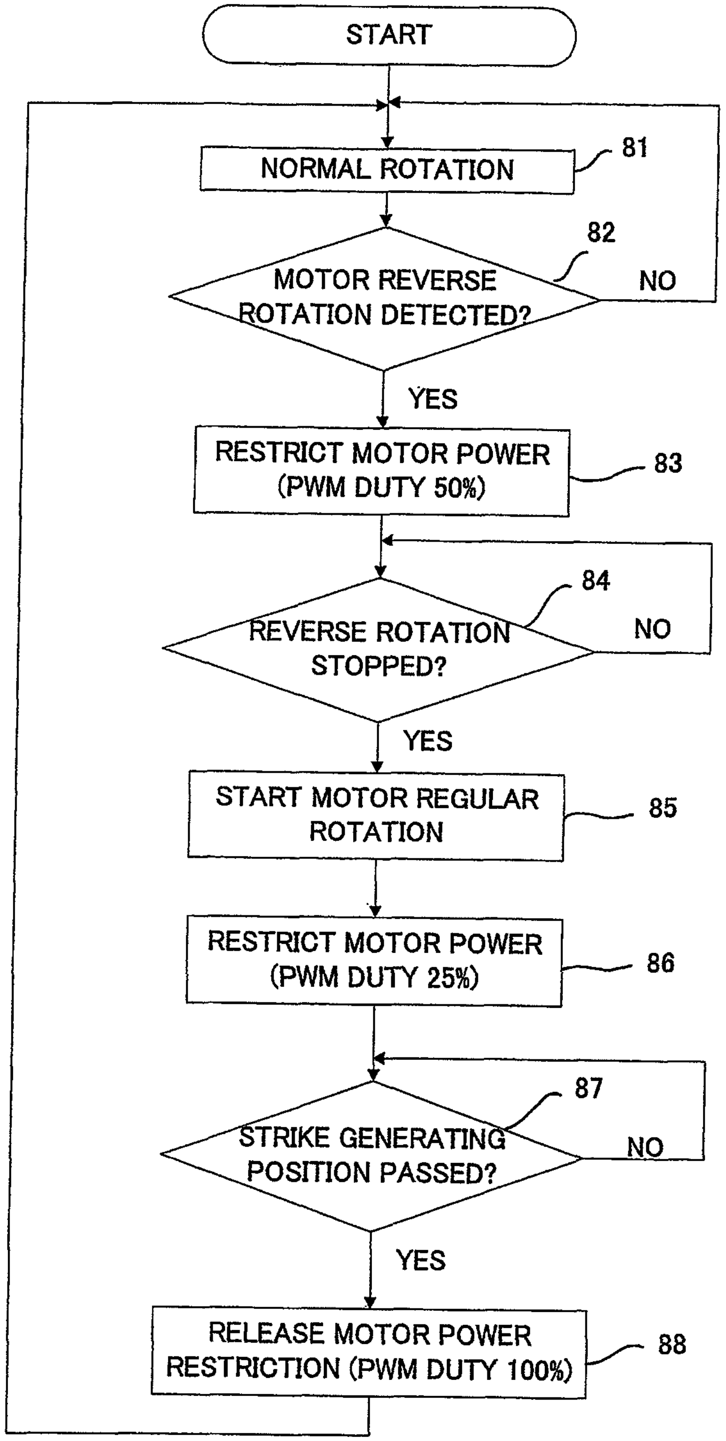
FIG. 8 is a flowchart of explaining a control procedure of a motor according to the embodiment of the invention.

Next, a control procedure of the motor 3 by the embodiment of the invention will be explained in reference to a flowchart of FIG. 8. According to the embodiment, it is assumed that the motor 3 is rotated by PWM duty of 100% at sections of circle 1 and circle 2 of FIG. 6B (step 81). Although the state is changed by an amount of pulling the trigger switch 8, according to the embodiment, in order to simplify the explanation, the explanation will be given by assuming that the amount of pulling the trigger switch 8 is 100%, and the rotational situation is referred to as ‘normal rotation’. Next, it is detected whether the liner 21 reaches the strike position of FIG. 6B and the motor 3 is rotated reversely by the strike (step 82). The reverse rotation of the motor 3 can be detected by using the rotational position detecting element 42 attached to the driving circuit board 7 of the motor 3. When the motor is not rotated reversely, the control procedure returns to step 81, when the motor is rotated reversely, the control procedure proceeds to step 83.

At step 83, the PWM duty ratio of the driving power to the motor 3 is reduced to 50%. The power is dropped in this way since at the section of circle 3 of FIGS. 6A and 6B, when the PWM duty ratio is made to stay to be 100%, the efficiency is poor. Further, because when the PWM duty ratio is made to be 0%, the reverse rotation of the motor 3 is not braked, and therefore, the driving power to some degree is needed.

Next, it is detected whether the reverse rotation of the motor 3 is stopped (step 84). It can be detected whether the reverse rotation is stopped by an output of the rotational position detecting element 42 of a Hall IC or the like attached to the driving circuit board 7 of the motor 3. When the reverse rotation of the motor 3 is stopped, the control procedure proceeds to a control of regularly rotating the motor 3 (step 85). At this occasion, a pulse is made not to generate in passing the strike position by restraining the PWM duty ratio to about 25% until passing section of circle 4 of FIGS. 6A and 6B (step 86). When it is detected at step 87 that the strike generating position is passed, the restriction of the driving power of the motor 3 is released, the PWM duty ratio is made to be 100%, and the motor 3 is driven such that a successive strike position is reached as fast as possible.

According to the control of the embodiment explained above, the power supplied to the electric motor is reduced immediately before transmitting the strike force to the output shaft or when the strike force is transmitted thereto, the normal power is recovered when the electric motor the rotation of which is disturbed by the pulse-like torque passes the strike position of the shaft, and therefore, the power consumed when the rotation of the motor is disturbed in generating the pulse-like torque can be reduced, and heat caused thereby can be prevented from being generated.

Figure 9:
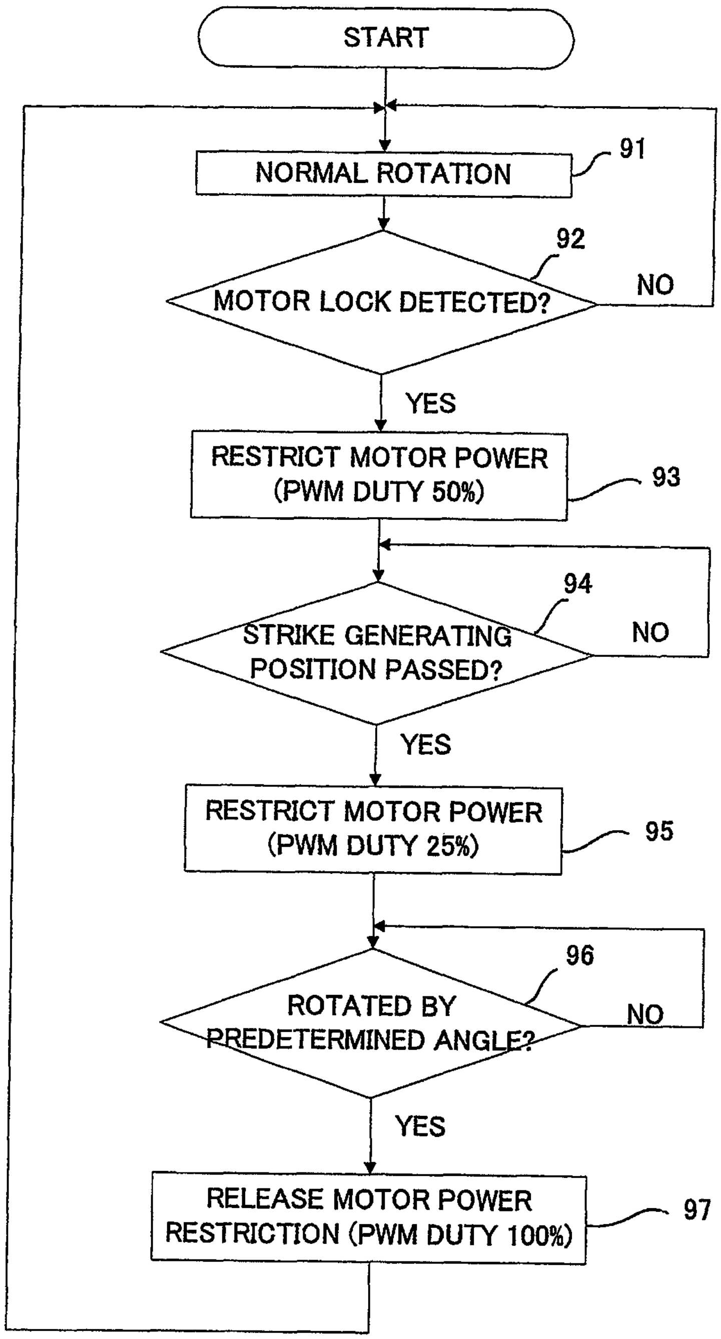
FIG. 9 is a flowchart showing a second modified example of the control procedure of the motor 3 according to the embodiment of the invention.

Next, a second modified example of the control procedure of the motor 3 according to the embodiment of the invention will be explained in reference to a flowchart of FIG. 9. It is assumed that the motor 3 is rotated normally by the PWM duty 100% at sections of circle 1 and circle 2 of FIG. 6B (step 91). Next, it is detected whether the motor 3 is rotated, the liner 21 reaches the strike position of FIG. 6B and rotation of the motor 3 is stopped, that is, locked by the strike (step 92). It can be detected whether the motor 3 is locked by using the rotational position detecting element 42 attached to the driving circuit board 7 of the motor 3. Here, locking of the motor 3 indicates that there is hardly paths of circle 3 and circle 4 in FIG. 6B. At step 92, when the motor is not locked, the control procedure returns to step 91 and when the motor is locked, the control procedure proceeds to step 93.

At step 93, the PWM duty ratio of the driving power to the motor 3 is reduced to 50%. The power is dropped in this way since when the motor 3 in a state of being locked is applied with the driving power of 100%, a large current flows. Further, because since a position after having been locked is disposed at a vicinity of the strike position, until passing the strike position, it is preferable not to constitute the driving power by 100%.

Next, it is detected whether the liner 21 passes the strike generating position (step 94). When the liner 21 does not pass the strike generating position, step 94 is repeated, and when the strike generating position is passed, the control procedure proceeds to step 95, the PWM duty ratio is restrained to about 25% and a pulse is prevented from being generated in passing the strike position (step 95). Further, it is determined whether the liner 21 is rotated by a predetermined angle indicated by circle 5 (step 96), and when it is detected that the liner 21 is rotated, restriction of the driving power of the motor 3 is released and the motor 3 is driven by the PWM duty ratio of 100% (step 97). Further, it can be identified whether the line 21 is rotated by the predetermined angle by using an output of the rotational position detecting element 42 and an output of the rotational position detecting sensor 13.

According to the control of the second modified example explained above, after the strike position is passed and an influence thereof is not effected, the normal power is recovered, and therefore, the motor can smoothly be rotated.

Figure 10:
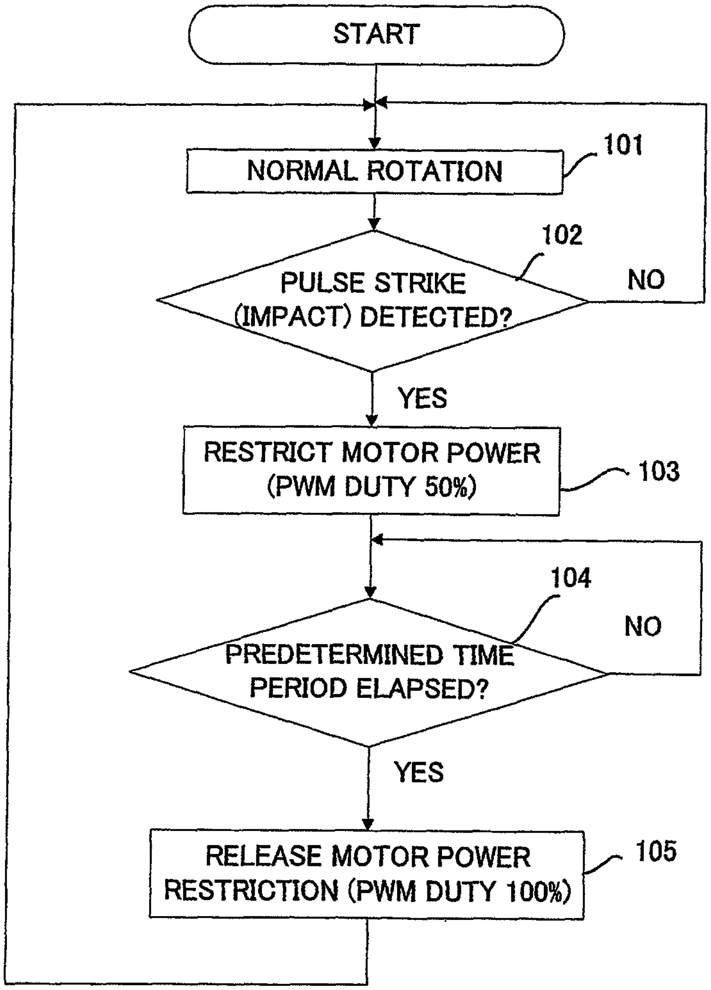
FIG. 10 is a flowchart showing a third modified example of the control procedure of the motor 3 according to the embodiment of the invention.

Next, a third modified example of the control procedure of the motor 3 according to the embodiment of the invention will be explained in reference to a flowchart of FIG. 10. It is assumed that the motor 3 is normally rotated by the PWM duty 100% at the sections of circle 1 and circle 2 of FIG. 6B (step 101). Next, it is detected whether the motor 3 is rotated, the liner 21 reaches the strike position of FIG. 6B, and the strike is carried out (step 102). It can be detected whether the strike is carried out by using an output of the torque detecting sensor (strain gage 12). At step 102, when the strike is not detected, the control procedure returns to step 101, when the strike is detected, the control procedure proceeds to step 103. At step 103, the PWM duty ratio of the driving power to the motor 3 is reduced to 50%. Next, at step 104, it is detected whether a predetermined time period has elapsed, when the elapse is detected, the restriction of the driving power of the motor 3 is released, and the motor 3 is driven by the PWM duty ratio of 100% (step 105). It can be detected whether a constant time period has elapsed after an impact is brought about by using a timer by a microcomputer included in the operating portion 41. Therefore, the third modified example can be applied even to a drive source which is not provided with the rotational position detecting element 42, for example, a direct current motor when the torque detecting sensor is provided.

Figure 11:
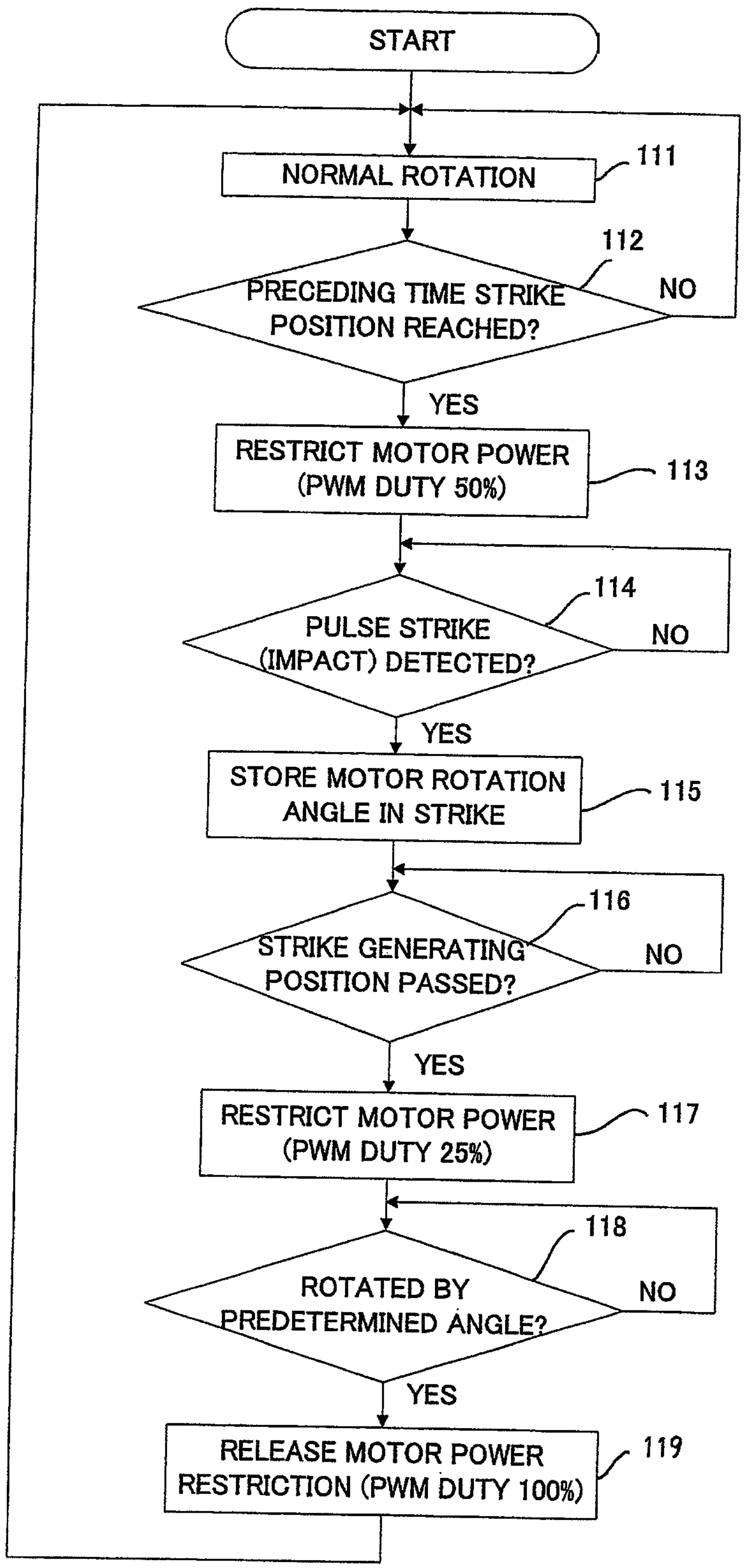
FIG. 11 is a flowchart showing a fourth modified example of the control procedure of the motor 3 according to the embodiment of the invention.

Next, a fourth modified example of the control procedure of the motor 3 according to the embodiment of the invention will be explained in reference to a flowchart of FIG. 11. It is assumed that the motor 3 is normally rotated by the PWM duty 100% at the sections of circle 1 and circle 2 of FIG. 6B (step 111). Next, it is detected whether the motor 3 is rotated and the liner 21 reaches the strike position of FIG. 6B (step 112). Here, a significance that the liner 21 reaches the strike position not only signifies that the position of the liner 21 completely coincides with the strike position but also signifies that the liner 21 falls in a predetermined range before or after the strike position, and particular preferably signifies that the liner 21 falls in a range of circle 2 of FIG. 6B. In order to determine whether the strike position is reached, a strike position at a preceding time is stored to the operating portion 41.

When the strike position is not reached, the control procedure returns to step 111, when the strike position is reached, the control procedure proceeds to step 113. At step 113, the PWM duty ratio of the driving power to the motor 3 is reduced to 50%. Next, it is detected whether the strike is carried out (step 114). It can be detected whether the strike is carried out by using the output of the torque detecting sensor (strain gage 12). When the strike is carried out, a rotational angle of the motor 3 at the strike is stored to the operating portion (step 115). Further, not only the rotational angle of the motor 3 but also a rotational position of the output shaft 5 may be stored.

Next, it is detected whether the motor 3 is regularly rotated after having been rotated reversely or stopped, and the strike generating position is passed (step 116), when the strike generating position is passed, the PWM duty ratio of the driving power to the motor 3 is reduced to 25% (step 117). Next, at step 118, it is detected whether rotated by a predetermined angle, when rotated, the restriction of the driving power of the motor 3 is released, and the motor 3 is driven by the PWM duty ratio of 100% (step 119). Therefore, according to the fourth modified example, the power supplied to the motor is reduced immediately before the position of a pulse generated at the oil pulse unit, and therefore, an adverse influence by the driving power which flows in the motor when the impact force is generated can be reduced. Further, the torque detecting sensor of detecting that the strike force is generated is provided, power supplied to the motor is adjusted based on the output of the torque detecting sensor, and therefore, a timing of reducing the driving power of the motor can be detected by a simple method.

Figure 12:
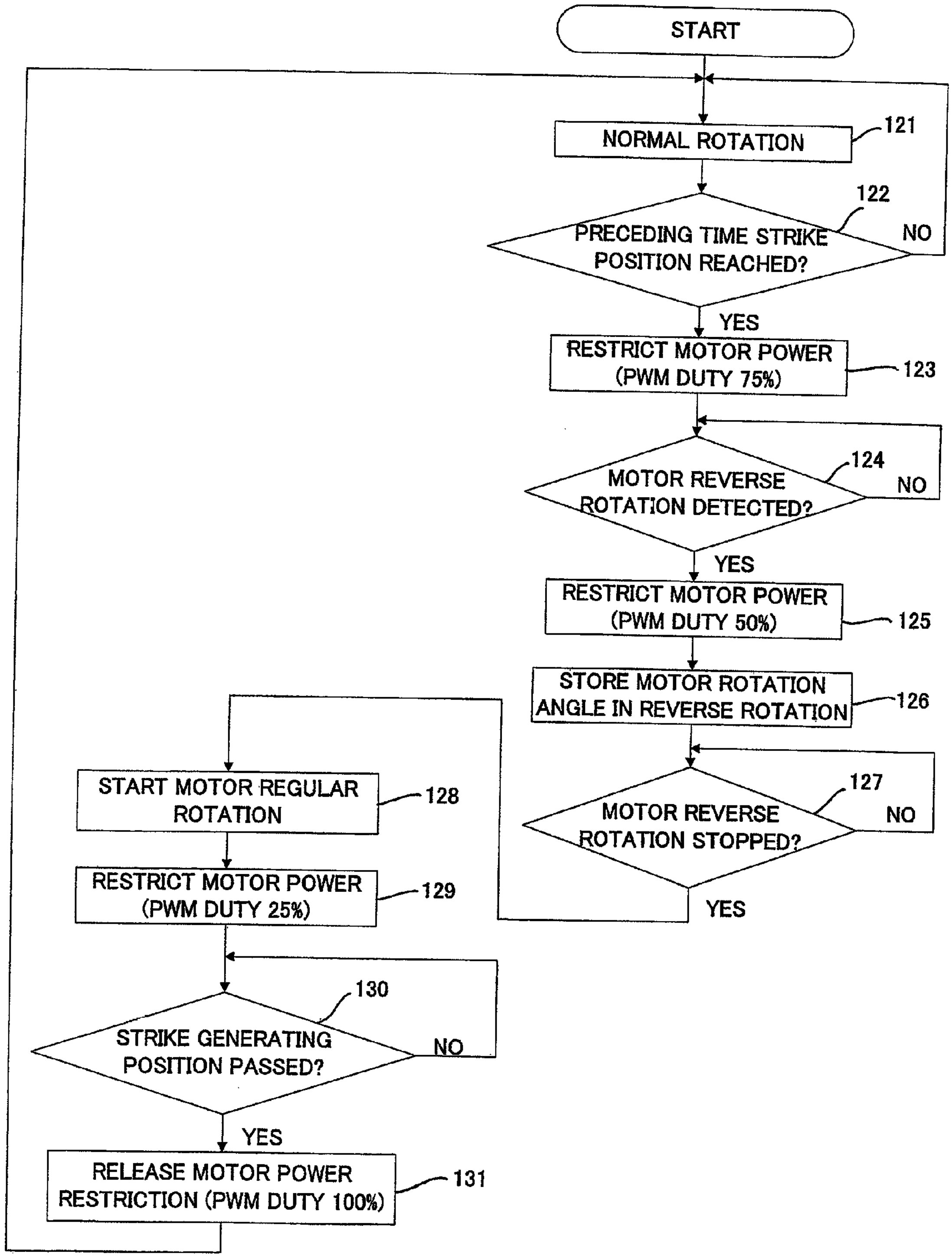
FIG. 12 is a flowchart showing a fifth modified example of the control procedure of the motor 3 according to the embodiment of the invention.

Next, a fifth modified example of the control procedure of the motor 3 according to the embodiment of the invention will be explained in reference to a flowchart of FIG. 12. It is assumed that the motor 3 is normally rotated by the PWM duty 100% at the sections of circle 1 and circle 2 of FIG. 6B (step 121). Next, it is detected whether the motor 3 is rotated and the liner 21 reaches the strike position at the preceding time (step 122). It is determined whether the strike position at the preceding time is reached based on a position stored to the operating portion 41. When the preceding time strike position is not reached, the control procedure returns to step 121 and when the preceding time strike position is reached, the control procedure proceeds to step 123. At step 123, the PWM duty ratio of the driving power to the motor 3 is reduced to 75%. Next, at step 124, it is detected whether the motor 3 is reversely rotated by the strike. When the motor is rotated reversely, the PWM duty ratio of the driving power to the motor 3 is reduced to 50%, and the rotational angle of the motor 3 when rotated reversely is stored to the operating portion 41 (steps 125, 126).

Next, it is detected whether reverse rotation of the motor 3 is stopped (step 127). When the stop of the motor 3 can be detected, a control of regularly rotating the motor is started (steps 127, 128). At this occasion, a pulse is prevented from being generated when the strike position is passed by restraining the PWM duty ratio to about 25% (step 129). At step 130, when it is detected that the strike generating position is passed, the restriction of the driving power of the motor 3 is released, the motor 3 is driven by the PWM duty ratio of 100%, and the motor 3 is driven to reach to succeeding strike position as fast as possible (step 131).

As explained above, according to the embodiment, when the motor is reversely rotated or stopped after the strike has been carried out, the driving current is restricted, and therefore, unnecessary power is not consumed, a consumption efficiency is promoted, further, also heat can be prevented from being generated. Further, according to the embodiment, when the strike position is passed again, the strike position is passed at a low speed, and therefore, the pulse is not generated, and therefore, a wasteful strike can be prevented, and smooth fastening operation can be carried out.

Next, a method of detecting a reduction in a performance of the oil pulse unit 4 will be explained in reference to FIGS. 13A through 14. According to the embodiment, a reduction in a performance of the oil pulse unit 4 by oil leakage is mainly aimed at, and it is constituted that an alarm is generated to an operator before the oil leakage becomes severe.

Figure 13A:
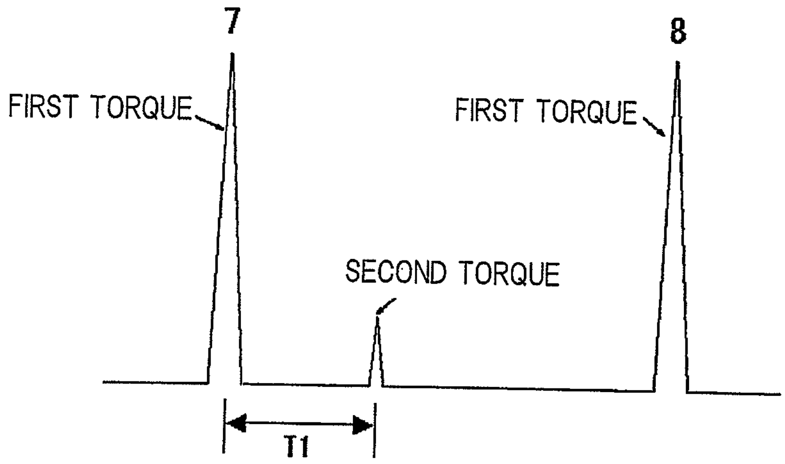
FIGS. 13A and 13B illustrate diagrams showing a time period during which the motor 3 is rotated reversely from a strike position shown in FIGS. 6A and 6B, thereafter, starts rotating regularly, passes again the strike position and reaches a succeeding strike position.
Figure 13B:
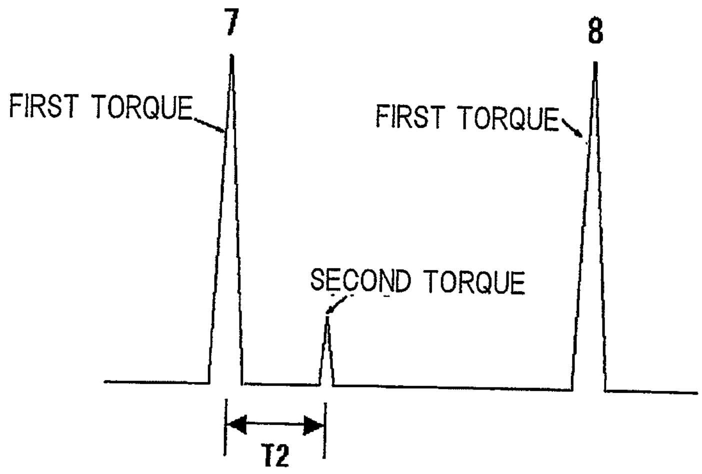

FIGS. 13A and 13B are diagrams showing a time period during which the motor 3 is rotated reversely from the strike position indicated by 68 of FIG. 6A, that is, a torque peak value, thereafter, starts rotating regularly, passes the strike position again, passes a position remote from the strike position by 180 degrees, and reaches the strike position again. FIG. 13A is a diagram showing a relationship between a torque generated by the oil pulse unit 4 of a new product and time. The torque when passing the strike position of the oil pulse unit 4 is provided with a property of being large at a high speed and small at a low speed by a viscosity of the oil. According to the torque, as shown by FIG. 13A, there is required a time period of T1 during which a large torque is generated once at a position at which the projected shape seal faces 27*a* and 26*a* as well as 27*b* and 26*b* are opposed to each other (seventh time strike), thereafter, the liner 21 is rotated reversely by receiving a reaction thereof, starts rotating regularly again by the rotational force of the motor 3, and passes again the strike position. Although a very small torque is generated at a position of being rotated by 180 degrees from the strike position, the torque is not illustrated here. Further, a next strike position (eighth time strike) is reached, the fastening torque is generated.

On the other hand, FIG. 13B indicates a data showing a relationship between the torque generated by the oil pulse unit 4 the performance of which is deteriorated by the oil leakage or the like and time. There is required a time period of T2 during which from generating the fastening torque at the strike position (seventh time strike), the motor 3 is rotated reversely and thereafter starts rotating regularly, passes the strike position again and the small torque is generated. As can be understood by comparing FIGS. 13A and 13B, a pass time period T until generating the small torque is shorter in the oil pulse unit 4 in which the oil leakage is brought about by a long time period of use or life or the like, and a relationship of T1>T2 is established. The reduction in the performance can be detected from the amount of reducing the time period.

Further, although a temperature of the oil at inside of the oil pulse unit 4 rises by continuously using the oil pulse tool 1, and the passing time period T is changed also by the temperature rise, in that case, the temperature returns to the original value when the oil is cooled, and therefore, the oil leakage can be detected by detecting an aging change of the pass time period T in being cooled or at the same temperature. Further, the pass time period T is changed also by the revolution number of the motor 3. Therefore, when the pass time period T is detected, it is preferable to monitor the pass time period T always under the same condition.

When the oil leakage of the oil pulse unit 4 is brought about, a resistance by the oil at inside of the liner 21 is reduced, and therefore, as a result, there is only required the time period of T2 as shown by (2) during which the motor 3 is rotated reversely, thereafter, starts rotating regularly, and the strike position is passed again. Therefore, it can be predicted or detected beforehand that the oil leakage is brought about by monitoring how the time period is changed agingly.

Figure 14:
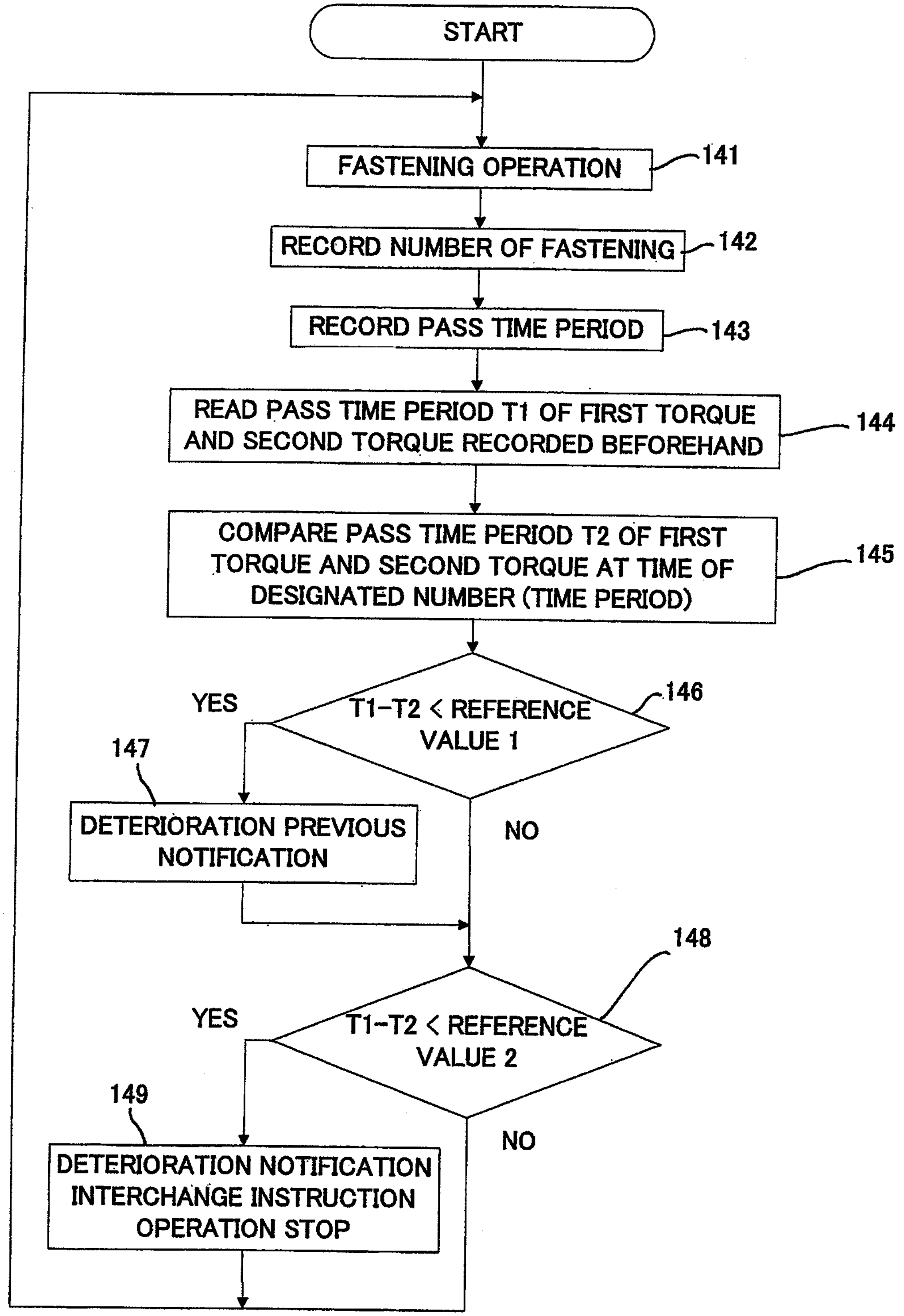
FIG. 14 is a flowchart of explaining a procedure of detecting oil leakage of the oil pulse unit 4.

FIG. 14 is a flowchart of explaining a procedure of detecting oil leakage by using the pass time period T. In FIG. 14, the fastening operation is carried out by applying the strike of the fastening torque as shown by FIG. 13A (step 141). A number of fastening at this occasion is recorded to a memory apparatus of the operating portion 41. A total of the number may be recorded, or, for example, data of respective predetermined numbers of respective 100 piece, or respective 500 piece may be recorded. Further, not only number information of 100-th, or 500-th, but date and time information may also be recorded in correspondence therewith.

Next, the pass time period T between the first torque and the second torque when a set torque is reached in the fastening is acquired (step 143). In FIG. 6A, the set torque is reached at a seventh time, and therefore, the pass time period T at the seventh strike is recorded, and therefore, the time interval T2 at that occasion is recorded (step 144). Next, reference values T1 and T2 previously recorded at the operating portion 41 are calculated (step 145). Although here, the calculation is carried out by T1−T2, the calculation is not limited thereto but T1/T2 or the like may be calculated.

At step 146, when T1−T2<reference value 1, there is a high possibility of bringing about oil leakage, and therefore, a deterioration previous notification is carried out (step 147). The notification may be carried out by lighting the light emitting diode 18, sounding a buzzer, or displaying at other display portion. Next, at step 148, when T1−T2<reference value 2, there is brought about a situation in which continuous use thereof is no longer suitable, and therefore, by notification of the statement, interchange of the oil pulse unit 4 may be instructed, or the operation is stopped such that the oil pulse unit 4 is prevented from being operated as necessary (step 149). Here, the reference value 2 is a time period shorter than that of the reference value 1.

As explained above, according to the embodiment, before the life of the oil pulse unit 4 is reached, the alarm is generated beforehand, and therefore, the influence by the oil leakage can be prevented from being effected at respective portions at inside of the oil pulse tool 1 by continuously using the oil pulse tool 1 without recognizing arrival of the life. Therefore, the operator can firmly be informed of a concern of the reduction in the performance or generation of the oil leakage. Further, by comparing the measured pass time period and the pass time period stored to the memory apparatus, the reduction in the performance of the oil pulse unit is detected, and therefore, the reduction in the performance can accurately be detected for respective tools without being influenced by the individual difference of the tool per se.

Further, although the control indicated by FIGS. 8 through 12 is carried out, there is the concern that generation of the small torque is restrained and the pass time period T cannot be measured, in that case, the pass time period T may be measured without carrying out a control of reducing the driving voltage applied to the motor 3 only when the pass time period T is measured. Further, as other method, when the pass time period T is reduced, as a result, the interval between the seventh time strike and the eighth time strike is shortened, and therefore, the reduction in the performance may be detected by a change in the interval of the strikes.

Further, as other method, it may be constituted that instead of measuring the pass time period T, the reverse rotation angle until the motor is stopped by reversely rotating the motor by generating the impact, the reduction in the performance of the oil pulse unit may be detected by the aging change of the reverse rotation angle.

Although the invention has been explained based on the embodiment as described above, the invention is not limited to the above-described mode but can be changed variously within the range not deviated from the gist. For example, although an explanation has been given of the example of using the brushless direct current motor as the drive source of the oil pulse tool, the invention is similarly applicable even by a direct current motor using a brush. Further, the invention is applicable similarly even by constituting the drive source by an air motor.

The present application is based on Japanese Patent Application No. 2008-122398, filed on May 8, 2008, the entire contents of which are incorporated herein by reference.

The invention claimed is:

1. An oil pulse tool comprising:

a motor generating a driving force according to a driving voltage;

an oil pulse unit driven by the driving force and generating a torque in a pulse-like shape on a shaft when the motor passes a strike position; and an output shaft on which a front end tool is mounted, the output shaft being connected to the shaft, characterized in that the oil pulse tool further comprises:

driving adjusting circuitry that (a) controls the driving voltage, (b) reduces the driving voltage to a voltage more than 0V during a given period including a timing when the torque is transmitted to the output shaft, and (c) increases the driving voltage when the given period is finished.

2. The oil pulse tool according to claim 1, wherein the motor is rotated in a reverse direction by a reaction of a strike based on the torque, and wherein the driving adjusting circuitry reduces the driving voltage when the motor is rotated reversely and until the motor is rotated in a regular rotation again and the motor passes the strike position.

3. The oil pulse tool according to claim 2, wherein the driving adjusting circuitry drives the motor by a first reduced driving voltage when the motor is rotated reversely, wherein the motor is driven by a second reduced driving voltage lower than the first reduced driving voltage until the motor is rotated in the regular rotation again and the motor passes the strike position.

4. The oil pulse tool according to claim 2, wherein the driving adjusting circuitry reduces the driving voltage immediately before the torque is generated, and wherein the driving adjusting circuitry further reduces the driving voltage after transmitting the torque to the output shaft.

5. The oil pulse tool according to claim 4 further comprising a torque detecting sensor configured to detect the torque transmitted to the output shaft, wherein the driving adjusting circuitry adjusts the driving force of the motor based on an output of the torque detecting sensor.

6. The oil pulse tool according to claim 1 further comprising rotational position detecting circuitry configured to detect a rotational position of the motor, wherein the driving adjusting circuitry adjusts the driving voltage of the motor based on an output of the rotational position detecting circuitry.

7. The oil pulse tool according to claim 1, wherein the motor is a brushless direct current motor, and the driving adjusting circuitry adjusts the driving voltage of the brushless direct current motor by changing a duty ratio of a power supplied by a PWM control.

* * * * *